10

2,971,042
METHOD OF MAKING STORAGE BATTERIES

Don G. Townsend, Anderson, Ind., assignor to General Motors Corporation, Detroit, Mich., a corporation of Delaware No Drawing. Filed July 25, 1958, Ser. No. 750,875

2 Claims. (Cl. 136—33)

This invention relates to storage batteries and is particularly concerned with a method for accomplishing an accelerated cure of negative plates of the pasted type as used in storage batteries. In Hindall Patent 2,656,400, a method for curing negative plates is disclosed which functions well but this process requires a substantial time period to effect the cure. In copending application, S.N. 750,879, filed concurrently herewith, a method is disclosed and claimed for fast curing of positive plates. This invention is related thereto and utilizes somewhat similar procedures in reverse order to effect an accelerated cure for negative plates for subsequent use in lead-acid storage batteries.

The present invention is directed to still another method for accomplishing curing of negative battery plates by accelerated methods wherein the plate may be fully cured in a fraction of the time required by any prior known method.

It is, therefore, an object of this invention to provide an accelerated cure for negative battery plates wherein the plates are subjected to a carbon dioxide atmosphere containing at least 10% carbon dioxide followed by pressurized steam treatment and air drying.

Another object of the invention is to provide a curing process wherein pasted plates are cured in an atmosphere containing 12½% carbon dioxide at 196° F. for ten minutes and are then autoclaved for about fifteen minutes in fifteen pounds steam maintained at 230° F. and thereafter are dried at 150° F. for fifteen minutes.

Further objects and advantages will be apparent from the description which follows.

Negative battery plates of the type cured by the present process for subsequent use in lead-acid storage batteries are made by pasting a lead or lead alloy grid with a paste made from a starting mixture of red litharge, yellow litharge and metallic lead in the ratio of about 30 to 45 to 25 and sulfuric acid. This paste, after mixing, includes about 30% red litharge, 55% of colloidal or semi-colloidal lead compounds believed to be basic lead sulfate and hydrated lead compounds and about 15% metallic lead. This paste is incorporated with the grid and the plates are ready for the curing process.

During the cure, the particle size of the ingredients of the plate paste can be controlled as can be the metallic lead content wherein the control has the added feature of controlling the particle size and metallic lead content of the formed plate after it is placed in the battery. Specifically, the plates, after pasting, are treated in an atmosphere containing carbon dioxide to form lead carbonate dispersed throughout the plate paste which yields a strong, and stable, structure. In this connection, I believe the salt formed is basic lead carbonate wherein the percent conversion should exceed 25%. I have found that the carbon dioxide content in the atmosphere must be at least 10% in order to get a thorough carbonate dispersion in the plate paste. By increasing the carbon dioxide content, it is possible to shorten the curing time and, by heating the plate during its exposure to the carbon dioxide, it is possible to shorten the cure and remove moisture from the plate. Specifically, I prefer to treat the pasted plate at a temperature of 196° F. wherein a 12% carbon dioxide content is present in the atmosphere. With these controls, a period of ten minutes is required. It is understood that carbon dioxide content in the curing atmosphere ranging from 10% to 100% may be used although I prefer about 12½% since it yields an easily controlled process. After this treatment, the carbonated plate is autoclaved to reduce the metal content by causing oxidation of some of the free lead. At the same time, the particles of oxide are refined in size. This autoclaving is accomplished in a steam chest or equivalent apparatus at 212° F. with atmospheric pressure steam although I prefer to use a positive pressure of fifteen pounds per square inch for about fifteen minutes wherein the temperature ranges in the neighborhood of 230° F.

The plates are next dried at about 150° F. for fifteen minutes. Higher temperatures may be used but excessively high temperatures above 212° F. cause a blistering and nonuniformity in the pasted plate and I prefer to use a temperature below the boiling point of water for this purpose wherein a maximum drying efficiency is obtained without deleterious results to the plate paste. It is understood, of course, that the temperature may be raised as the pressure is raised from atmospheric pressure to prevent boiling or erupting of the moisture from the plate whereby even greater acceleration may be obtained although the application of carbon dioxide to the material to cause formation of lead carbonate requires time and, for this reason, a ten minute cure is preferred at the temperatures and with the carbon dioxide percentages noted.

Carbonated negative plates of the character formed by this procedure form very well when incorporated in a battery to which electrolyte such as sulfuric acid is added.

Plates cured by this method are more rugged and resistant to shock in the unformed state and yield, after formation, discharge rates about 5% higher than similar plates cured by other methods. For example, displacement of the active material pellets from a pasted plate cured by the best known prior art method required 382 p.s.i. while the same test run on a similar pasted plate cured by the present method required 444 p.s.i. thus showing the improved physical properties of plates cured by this method. Furthermore, the time for curing is markedly reduced and the method permits close control of particle size and metallic lead content of the unformed plate. The method may be carried out by batch procedures or by continuous methods as desired through the use of well known equipment. In general, however, the desirability of the present method revolves around the reduced time period required for curing the plate together with the increased ruggedness and improved electrical properties with which the plate is endowed.

While the embodiments of the present invention as herein disclosed constitute preferred forms, it is to be understood that other forms might be adopted.

What is claimed is as follows:

1. In a method for curing a negative plate for use in a lead-acid storage battery wherein the plate includes a paste formed from a mixture of sulfuric acid and a mixture of yellow and red lead oxides including up to 15% free lead, the steps consisting of; curing the plate at temperatures below 212° F. in an atmosphere containing carbon dioxide ranging between 10% and 100% and the remainder air for a time sufficient to form a lead carbonate surface on the plate paste, steam treating the carbonated plate with wet steam at pressures ranging from atmospheric to about fifteen pounds per square inch and at temperatures ranging respectively from 212° F. to 230° F. for oxidizing free lead and simultaneously refining the grain size of the oxides and then drying the cured plate in hot air at temperatures between 150° F. and 212° F.

2. In a method for curing a negative plate for use in a lead-acid storage battery wherein the plate includes a paste formed from a mixture of sulfuric acid and paste forming materials including yellow and red litharge and free lead, the steps consisting of; subjecting a pasted plate for about ten minutes to an atmosphere maintained at 196° F. and containing around 12½% carbon dioxide and the remainder air, treating said plate with steam at a pressure of fifteen pounds per square inch and at a temperature of 230° F. for about fifteen minutes, and then drying the plate for about fifteen minutes at 150° F.

References Cited in the file of this patent

UNITED STATES PATENTS

| | | |
|---|---|---|
| 2,149,812 | Lindstrom | Mar. 7, 1939 |
| 2,656,399 | Hindall et al. | Oct. 20, 1953 |
| 2,656,400 | Carson et al. | Oct. 20, 1953 |

OTHER REFERENCES

Vinal: Storage Batteries, 4th Ed., 1955, pp. 34 and 35.